United States Patent
Yoshino et al.

(10) Patent No.: US 11,254,007 B2
(45) Date of Patent: Feb. 22, 2022

(54) MACHINE TOOL

(71) Applicant: OKUMA Corporation, Aichi (JP)

(72) Inventors: Kiyoshi Yoshino, Aichi (JP); Shoichi Morimura, Aichi (JP)

(73) Assignee: OKUMA CORPORATION, Aichi (JP)

( * ) Notice: Subject to any disclaimer, the term of this patent is extended or adjusted under 35 U.S.C. 154(b) by 212 days.

(21) Appl. No.: 16/589,441

(22) Filed: Oct. 1, 2019

(65) Prior Publication Data

US 2020/0108503 A1 Apr. 9, 2020

(30) Foreign Application Priority Data

Oct. 4, 2018 (JP) .............................. JP2018-189446

(51) Int. Cl.
*B25J 13/08* (2006.01)
*B25J 9/16* (2006.01)

(52) U.S. Cl.
CPC .......... *B25J 9/1694* (2013.01); *B25J 13/087* (2013.01)

(58) Field of Classification Search
CPC ................. B25J 9/1694; B25J 13/087; G05B 2219/39195; G05B 2219/37435
USPC ................................ 700/245, 258; 702/188
See application file for complete search history.

(56) References Cited

U.S. PATENT DOCUMENTS

| 6,296,093 B1 * | 10/2001 | Norris | B23Q 11/0032 |
| | | | 188/378 |
| 2014/0249772 A1 * | 9/2014 | Sprenger | G01B 21/045 |
| | | | 702/152 |
| 2018/0024572 A1 * | 1/2018 | Kai | G05B 19/404 |
| | | | 318/615 |
| 2018/0150053 A1 * | 5/2018 | Takaoki | G05B 19/4062 |

FOREIGN PATENT DOCUMENTS

JP 10249455 A 9/1998

* cited by examiner

*Primary Examiner* — Dalena Tran
(74) *Attorney, Agent, or Firm* — Cantor Colburn LLP

(57) ABSTRACT

A machine tool is disclosed which can suppress resonance of an in-machine robot even when vibration occurs during machining of a workpiece. Vibration of the in-machine robot is detected by a vibration sensor of the in-machine robot. When the vibration of the in-machine robot becomes greater than or equal to a threshold during machining of the workpiece, a controller changes a natural frequency of the in-machine robot by exchanging an end effector of the in-machine robot or by changing an orientation of the in-machine robot, to thereby suppress resonance of the in-machine robot.

10 Claims, 3 Drawing Sheets

MACHINE TOOL

CROSS REFERENCE TO RELATED APPLICATION

The present application claims priority under 35 U.S.C. § 119 to Japanese Patent Application No. 2018-189446 filed on Oct. 4, 2018, the entire content of which is incorporated herein by reference.

TECHNICAL FIELD

The present disclosure relates to a machine tool, and in particular to a vibration suppressing technique.

BACKGROUND

A technique is known in which an in-machine robot for transporting a workpiece or the like is placed inside a machine tool. Even in the machine tool, if a workpiece having a notch is lathe-turn machined with a lathe, because a force is generated intermittently, vibration is caused. In addition, when the machining condition is harsh due to a high load or the like, even in a continuous lathe-turn machining, chattering may be caused, and vibration may consequently be caused.

JP H10-249455 A, which is not related to an in-machine robot, discloses a hemming apparatus in which a hemming blade is mounted on a robot arm via a vibration source, a part to be bend-machined of a workpiece, which is continuous, is pressed and bent by the hemming blade which is driven by the vibration source, and the hemming blade is thereafter laterally moved along the part to be bend-machined, to continuously bend the part to be bend-machined. JP H10-249455 A further describes that a weight for suppressing resonance of the robot arm due to the vibration of the hemming blade is detachably attached to at least one of the hemming blade and the vibration source thereof.

When the vibration is caused in the machine tool, the vibration is transferred also to the in-machine robot, and a resonance phenomenon may be caused in which the in-machine robot vibrates intensely. When such a resonance phenomenon occurs, a trace of the vibration may be left on the workpiece, causing a product defect, or, in a case where the vibration is intense, the in-machine robot itself may be damaged.

An advantage of the present disclosure lies in provision of a technique which can suppress resonance of the in-machine robot even when vibration is caused during machining of a workpiece.

SUMMARY

According to one aspect of the present disclosure, there is provided a machine tool comprising: an in-machine robot; a vibration sensor that detects vibration of the in-machine robot during a cutting process; and a controller that executes a process to change a natural frequency of the in-machine robot when the detected vibration is greater than or equal to a threshold. The controller may be constructed to include one or more processors such as a CPU, and a memory which stores a control program and a control parameter. The one or more processors are configured to, by executing a control program stored in the memory, execute the process to change the natural frequency of the in-machine robot.

According to another aspect of the present disclosure, in the machine tool, the controller executes, as the process to change the natural frequency, a process to exchange an end effector of the in-machine robot with another end effector having a different mass.

According to another aspect of the present disclosure, in the machine tool, the controller executes, as the process to change the natural frequency, a process to change an orientation of the in-machine robot.

According to another aspect of the present disclosure, in the machine tool, the controller executes, as the process to change the natural frequency, one of a process to exchange an end effector of the in-machine robot with another end effector having a different mass or a process to change an orientation of the in-machine robot, and further executes the other of these processes when the vibration does not become lower than the threshold.

According to another aspect of the present disclosure, in the machine tool, the controller executes, as the process to change the natural frequency, one of a process to exchange an end effector of the in-machine robot with another end effector having a different mass or a process to change an orientation of the in-machine robot when the detected vibration is greater than or equal to a first threshold serving as the threshold, and executes the other of these processes when the detected vibration is greater than or equal to a second threshold serving as the threshold, the second threshold being greater than the first threshold.

According to various aspects of the present disclosure, even when vibration occurs during machining of a workpiece and a resonance phenomenon is consequently caused in the in-machine robot, the resonance phenomenon can be suppressed by changing the natural frequency of the in-machine robot. With this configuration, product defects and damages of the in-machine robot can be prevented.

BRIEF DESCRIPTION OF DRAWINGS

Embodiment(s) of the present disclosure will be described based on the following figures, wherein.

DESCRIPTION OF EMBODIMENTS

Figure 1:
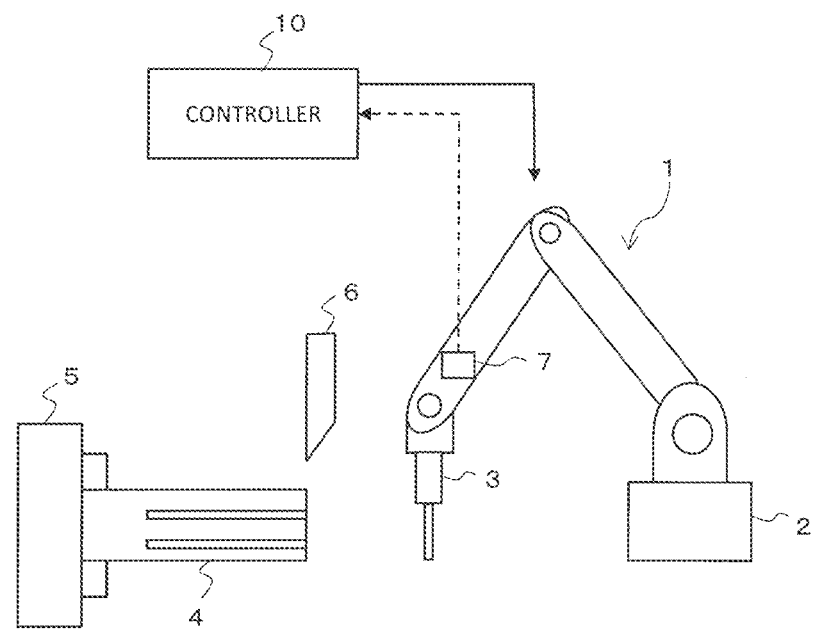
FIG. 1 is a structural diagram of a machine tool according to an embodiment of the present disclosure.

An embodiment of the present disclosure will now be described with reference to the drawings.

A machine tool according to the present embodiment is a multi-tasking machine having a lathe-turning function to bring a tool (lathe-turn tool) 6 into contact with a workpiece 4 while the workpiece 4 is rotated, and to cut the workpiece 4, and a rotation-cutting function to cut the workpiece 4 with a rotating tool. A periphery of a main body portion of the machine tool is covered by a cover (not shown). A space partitioned by the cover is a machining chamber in which the workpiece 4 is machined. On the cover, at least one opening and a door which opens and closes the opening (neither of which is shown) are provided. An operator accesses the main body portion of the machine tool, the workpiece 4, or the like through the opening. During the machining, the door provided on the opening is closed. This is for the sake of safety and the surrounding environment.

The main body portion comprises a workpiece spindle apparatus which holds the workpiece 4 in a manner to allow self-rotation, a tool spindle apparatus which holds the rotating tool in a manner to allow self-rotation, and a tool post which holds the tool 6. The workpiece spindle apparatus includes a head stock mounted on a pedestal, and a workpiece spindle attached to the head stock. The workpiece spindle has a chuck 5 or a collet which detachably holds the workpiece 4, and the workpiece 4 to be held can be suitably exchanged. The workpiece spindle self-rotates around a workpiece rotational axis.

The tool spindle apparatus holds a tool for milling (rotating tool); for example, a tool called a milling cutter and an end mill in a manner to allow self-rotation, and includes a spindle head inside of which a drive motor or the like is built, and a tool spindle attached to the spindle head. The tool spindle has a damper which detachably holds the rotating tool, and the rotating tool to be held can be exchanged as necessary.

In addition, an in-machine robot 1 is attached to the pedestal via a base portion 2. The in-machine robot 1 is used for support of machining, various sensing operations, and various support tasks. In the present embodiment, the in-machine robot 1 in particular executes tasks such as holding and transporting the workpiece 4, flipping over the workpiece 4, or the like.

A controller 10 controls driving of various parts of the machine tool according to a command from an operator. The controller 10 is formed from, for example, a CPU which executes various calculations and a memory which stores various control programs and control parameters. In addition, the controller 10 has a communication function, and can exchange various data such as, for example, NC program data, with other devices. The controller 10 may include a numerical controller which continuously calculates positions of the tool 6 and the workpiece 4, and a position of the in-machine robot 1. The controller 10 may be a single device, or may be formed by combining a plurality of calculation devices.

The in-machine robot 1 is, for example, an articulated robot having a plurality of arms and a plurality of joints, and an end effector 3 is provided at a tip thereof. The in-machine robot 1 is attached to the pedestal via the base portion 2 serving as a connection mechanism. The connection mechanism is attached to the pedestal via a bearing, and is rotatable with respect to the pedestal. An actuator such as a motor is attached to the connection mechanism, and driving of the actuator is controlled by the controller 10. In addition, an actuator such as a motor is attached to the plurality of joints of the in-machine robot 1, and driving of these actuators is controlled by the controller 10. The controller 10 calculates a position of the end effector 3 based on amounts of driving of the actuators provided on the connection mechanism and on the joints. The end effector 3 is a member which applies a certain action to a target, and is, in the present embodiment, a gripper which grips the workpiece 4, or the like.

A vibration sensor 7 is provided at a predetermined position of the in-machine robot 1; for example, inside of one of the plurality of the arms. The vibration sensor 7 detects vibration of the in-machine robot 1, and outputs the detected vibration to the controller 10. The controller 10 receives input of the vibration detected by the vibration sensor 7, and monitors as to whether or not a magnitude (amplitude) of the vibration is greater than or equal to a threshold. When the workpiece 4 having a notch such as a spline is cut-machined by the tool 6, because the machining is intermittent cutting, an exciting force is produced at a point of machining, resulting in vibration of the workpiece 4 or the tool 6. This vibration is transferred to the in-machine robot 1 via the base portion 2, causing a vibration of the in-machine robot 1. For example, when the spindle rotational rate is 600/min., and 6 notches are present in the workpiece 4 per one revolution, a vibration of a frequency of 60 Hz is caused. When this vibration frequency coincides with a natural frequency of the in-machine robot 1, a resonance phenomenon is caused in which the in-machine robot 1 vibrates intensely. When the resonance phenomenon occurs in the in-machine robot 1, a trace of the vibration may be left on the workpiece 4, resulting in a product defect, or the in-machine robot 1 may be damaged.

In consideration of this, the controller 10 judges that the resonance phenomenon is caused in the in-machine robot 1 when the amplitude of the detected vibration becomes greater than or equal to the threshold, and executes a process to change the natural frequency of the in-machine robot 1. When a mass of the end effector 3 is m and rigidity of the in-machine robot 1 is k, the natural frequency f of the in-machine robot 1 can be given by:

$$f = 1/2\pi \cdot (k/m)^{1/2}$$

Therefore, in order to change the natural frequency f, the mass m of the end effector 3 may be changed, the rigidity k may be changed, or both the mass m of the end effector 3 and the rigidity k may be changed.

In order to change the mass m of the end effector 3, the end effector 3 may be exchanged with another end effector having a different mass. For example, when the rigidity k of the in-machine robot 1 is $8 \times 10^{-3}$ N/m and the mass m of the end effector 3 is 5.5 kg, the natural frequency f is 60 Hz. When the spindle rotational rate is 600/min. and there are 6 notches on the workpiece 4 per revolution, as described above, a vibration of 60 Hz occurs, which coincides with the natural frequency of the in-machine robot 1, causing the resonance. Thus, the end effector 3 may be exchanged with an end effector having a mass m of 3 kg, in which case, the natural frequency of the in-machine robot 1 is changed to 81 Hz, and the resonance can be suppressed.

The exchange of the end effector 3 may be automatically performed by the in-machine robot 1 under control of the controller 10, or the controller 10 may output a message informing the operator of the exchange of the end effector 3 and the operator may manually exchange the end effector 3. That is, the changing process of the natural frequency at the controller 10 includes, in addition to an automatic exchange of the end effector 3, an output of a message promoting exchange of the end effector 3 to the operator, or the like.

In order to change the rigidity k, an orientation of the in-machine robot 1 may be changed. Specifically, the rigidity of the in-machine robot 1 is such that the rigidity k is relatively low in a state where the arm is extended, and the rigidity k is relatively high in a state where the arm is folded. For example, when the rigidity k of the in-machine robot 1 in the state where the arm is extended is $8 \times 10^{-3}$ N/m and the mass m of the end effector 3 is 5.5 kg, the natural frequency f is 60 Hz. When the spindle rotational rate is 600/min. and there are 6 notches on the workpiece 4 per revolution, as described above, a vibration of 60 Hz is caused, which coincides with the natural frequency of the in-machine robot 1, causing the resonance. Thus, the in-machine robot 1 may be changed to a state where the arm is folded so that the rigidity k is increased, and the natural frequency of the in-machine robot 1 is changed from 60 Hz, to consequently suppress the resonance. The change of the orientation of the in-machine robot 1 may be automatically executed under control of the controller 10.

Figure 2:
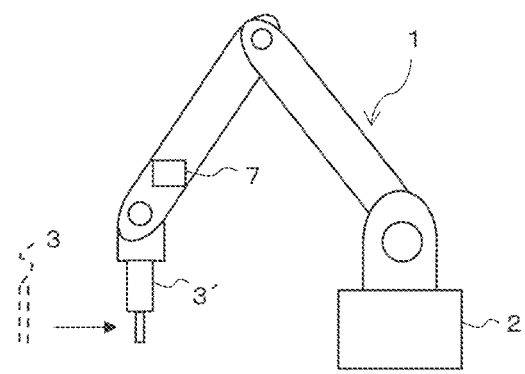
FIG. 2 is an explanatory diagram of an exchange of an end effector according to an embodiment of the present disclosure.

FIG. 2 schematically shows the exchange of the end effector 3. The end effector 3 is exchanged with another end effector 3', to change the mass m, and to consequently change the natural frequency of the in-machine robot 1. Needless to say, when the end effector 3 is exchanged, the end effector 3 is exchanged within a range where machining of the workpiece 4 is not affected.

Figure 3:
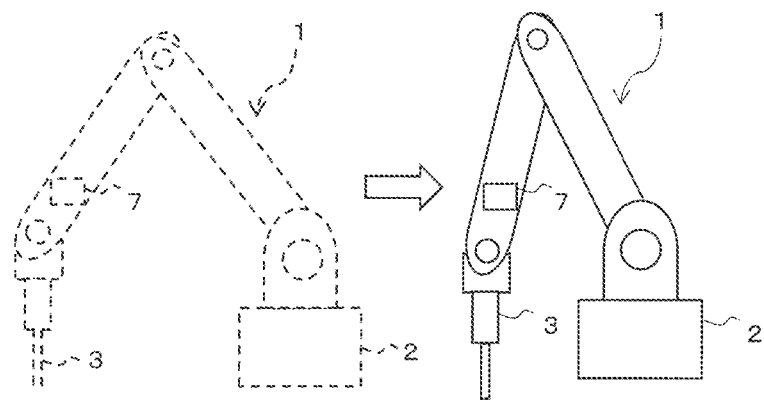
FIG. 3 is an explanatory diagram of a change of an orientation of an in-machine robot according to an embodiment of the present disclosure.

FIG. 3 schematically shows the change of the orientation of the in-machine robot 1. The in-machine robot 1 is changed from the state where the arm is extended to the state where the arm is folded, to change the rigidity k, and to consequently change the natural frequency of the in-machine robot 1. Needless to say, when the orientation is changed, the orientation is changed within a range where the machining of the workpiece 4 is not affected.

Figure 4:
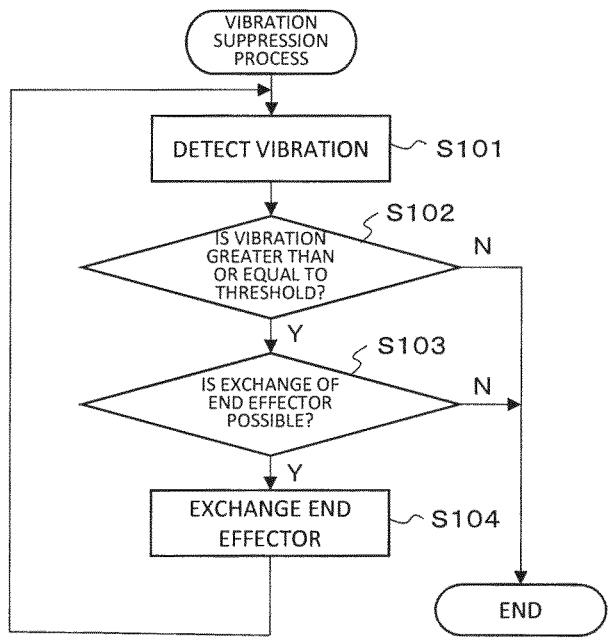
FIG. 4 is a process flowchart of an embodiment of the present disclosure.

FIG. 4 shows a process flowchart of the present embodiment. The flowchart is for a process of suppressing the vibration by exchanging the end effector 3 of the in-machine robot 1, which is repeatedly executed by the controller 10 with a predetermined control period during machining of the workpiece 4.

When the vibration sensor 7 detects vibration (S101), the detected vibration data is output to the controller 10.

The controller 10 receives an input of the vibration data, compares the amplitude of the vibration with a threshold, and judges whether or not the amplitude of the vibration is greater than or equal to the threshold (S102).

When the amplitude of the vibration is greater than or equal to the threshold (YES in S102), the controller 10 then judges whether or not exchange of the end effector 3 is possible (S103). Depending on the type of machining for the workpiece 4, another end effector different from the currently-used end effector 3 can be used, in which case (YES in S103), the end effector is exchanged with the other end effector having a different mass, and the machining is continued (S104). If the vibration becomes lower than the threshold as a result of the exchange of the end effector 3 (NO in S102), the vibration suppressing process is completed, and the machining of the workpiece 4 is continued with the exchanged end effector. On the other hand, when the vibration remains greater than or equal to the threshold even after the exchange of the end effector 3 (YES in S102), the exchange process of the end effector is again executed (S103, S104). When there is no end effector 3 which can be exchanged, the process is completed (NO in S103). In this case, the controller 10 displays an error message, and requests the operator to take a countermeasure.

Figure 5:
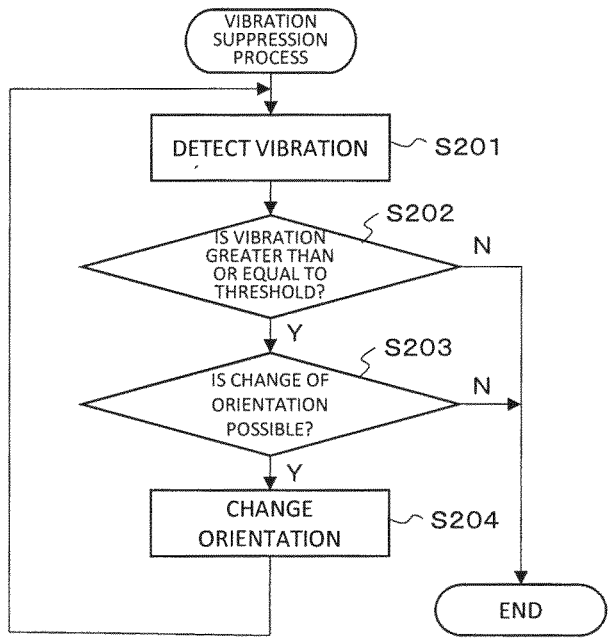
FIG. 5 is another process flowchart of an embodiment of the present disclosure.

FIG. 5 is another process flowchart of the present embodiment. The flowchart is for a process to suppress the vibration by changing the orientation of the in-machine robot 1, which is repeatedly executed by the controller 10 in a predetermined control period during the machining of the workpiece 4.

When the vibration sensor 7 detects vibration (S201), the detected vibration data is output to the controller 10.

The controller 10 receives an input of the vibration data, compares the amplitude of the vibration with a threshold, and judges whether or not the amplitude of the vibration is greater than or equal to the threshold (S202).

When the amplitude of the vibration is greater than or equal to the threshold (YES in S202), the controller 10 then judges whether or not change of an orientation of the in-machine robot 1 is possible (S203). Depending on the type of machining for the workpiece 4, the current orientation may be changed, in which case (YES in S203), the orientation is changed and the machining of the workpiece 4 is continued (S204). If the vibration becomes lower than the threshold as a result of the change of the orientation (YES in S202), the vibration suppression process is completed, and the machining of the workpiece 4 is continued with the changed orientation. On the other hand, when the vibration remains greater than or equal to the threshold even after the orientation change (YES in S202), the orientation changing process is again executed (S203, S204). When the orientation of the in-machine robot 1 cannot be changed, the process is completed (NO in S203). In this case, the controller 10 displays an error message and requests a countermeasure to the operator.

Figure 6:
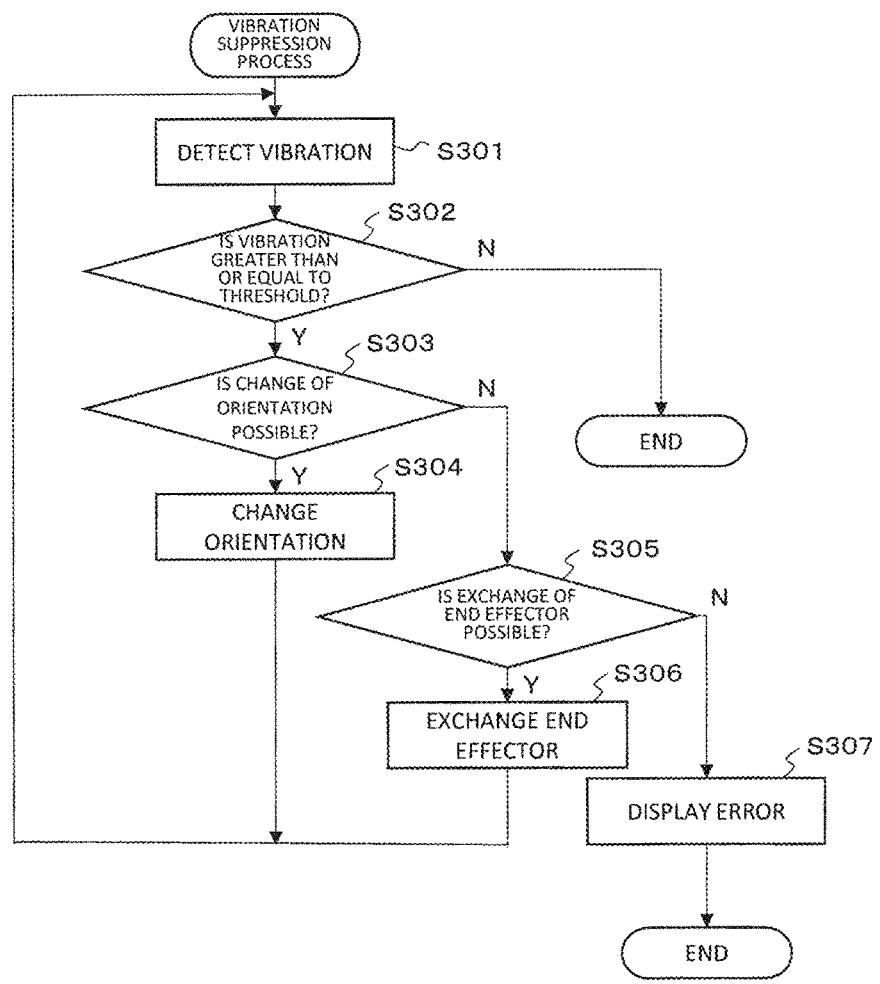
FIG. 6 is yet another process flowchart of an embodiment of the present disclosure.

FIG. 6 shows yet another process flowchart of the present embodiment. The flowchart is for a process to suppress vibration by combining the orientation change of the in-machine robot 1 and the exchange of the end effector 3, which process is repeatedly executed by the controller 10 at a predetermined control period during the machining of the workpiece 4.

When the vibration sensor 7 detects vibration (S301), the detected vibration data is output to the controller 10.

The controller 10 receives an input of the vibration data, compares the amplitude of the vibration with a threshold, and judges whether or not the amplitude of the vibration is greater than or equal to the threshold (S302).

When the amplitude of the vibration is greater than or equal to the threshold (YES in S302), the controller 10 then judges whether or not change of the orientation of the in-machine robot 1 is possible (S303). Depending on the type of the machining for the workpiece 4, the current orientation may be changed, in which case (YES in S303), the orientation is changed and the machining of the workpiece 4 is continued (S304).

On the other hand, when the orientation of the in-machine robot 1 cannot be changed (S303) the controller 10 then judges whether or not the exchange of the end effector 3 is possible (S305). If the exchange of the end effector 3 is possible while the orientation change is not possible (YES in S305), the end effector 3 is exchanged with another end effector having a different mass (S306), and the machining of the workpiece 4 is continued. If the orientation change and the exchange of the end effector 3 are both impossible, the controller 10 displays an error, and requests the operator to take a countermeasure (S307).

In this process, the orientation change of the in-machine robot 1 is prioritized, and, when the vibration is greater than or equal to the threshold and the resonance is caused, first, the orientation change is executed with a higher priority. When the orientation cannot be changed, the change of the end effector 3 is executed, to suppress the resonance.

In the process of FIG. 6, the orientation change is executed with a higher priority because the orientation change can be executed more easily than the exchange of the end effector 3. However, if the exchange of the end effector 3 is easier than the orientation change, the exchange of the end effector 3 may be executed with a higher priority. In other words, one of the exchange of the end effector 3 and the orientation change may be executed, and then, if the vibration does not become lower than the threshold even after this process, the other process may be executed.

An embodiment of the present disclosure has been described. The present disclosure, however, is not limited to the embodiment described above, and various modifications are possible.

For example, in the embodiment, a lathe is exemplified. Alternatively, in a machining center also, vibration may be caused by an intermittent cutting by a tool, and the resonance of the in-machine robot 1 can be suppressed by executing at least one of the exchange of the end effector 3 or the orientation change.

In addition, in the embodiment, the vibration sensor 7 is provided on the arm of the in-machine robot 1, but alternatively, an encoder of the motor of the in-machine robot 1 may be used as the vibration sensor 7.

Furthermore, in the embodiment, it is judged that the resonance phenomenon has occurred in the in-machine robot 1 when the amplitude of the detected vibration is greater than or equal to the threshold. Alternatively, a first threshold and a second threshold (in a relationship of the first threshold<the second threshold) may be set as the threshold, it may be judged that there is a possibility of resonance when the amplitude of the vibration becomes greater than or equal to the first threshold and the orientation of the in-machine robot 1 may be changed, and it may be judged that the resonance is caused when the amplitude of the vibration becomes greater than or equal to the second threshold and the process to exchange the end effector 3 may be executed. That is, the process to change the natural frequency may be changed according to the amplitude of the vibration.

The invention claimed is:

1. A machine tool comprising:
an in-machine robot;
a vibration sensor that detects vibration of the in-machine robot during a cutting process; and
a controller that executes a process to change a natural frequency of the in-machine robot when the detected vibration is greater than or equal to a threshold, wherein
the controller executes, as the process to change the natural frequency, a process to exchange an end effector of the in-machine robot with another end effector having a different mass.

2. A machine tool comprising:
an in-machine robot;
a vibration sensor that detects vibration of the in-machine robot during a cutting process; and
a controller that executes a process to change a natural frequency of the in-machine robot when the detected vibration is greater than or equal to a threshold, wherein
the controller executes, as the process to change the natural frequency, a process to change an orientation of the in-machine robot.

3. The machine tool according to claim 2, wherein
the controller executes, as the process to change the natural frequency, a process to change between a state where the in-machine robot has an extended arm and a state where the in-machine robot has a folded arm.

4. A machine tool comprising:
an in-machine robot;
a vibration sensor that detects vibration of the in-machine robot during a cutting process; and
a controller that executes a process to change a natural frequency of the in-machine robot when the detected vibration is greater than or equal to a threshold, wherein
the controller executes, as the process to change the natural frequency, one of a process to exchange an end effector of the in-machine robot with another end effector having a different mass or a process to change an orientation of the in-machine robot, and further executes the other of these processes when the vibration does not become lower than the threshold.

5. A machine tool comprising:
an in-machine robot;
a vibration sensor that detects vibration of the in-machine robot during a cutting process; and
a controller that executes a process to change a natural frequency of the in-machine robot when the detected vibration is greater than or equal to a threshold, wherein
the controller executes, as the process to change the natural frequency, one of a process to exchange an end effector of the in-machine robot with another end effector having a different mass or a process to change an orientation of the in-machine robot when the detected vibration is greater than or equal to a first threshold serving as the threshold, and executes the other of these processes when the detected vibration is greater than or equal to a second threshold serving as the threshold, the second threshold being greater than the first threshold.

6. A machine tool comprising:
an in-machine robot;
a vibration sensor that detects a vibration of the in-machine robot during a cutting process; and
one or more processors configured to, by executing a program stored in a memory: execute a process to change a natural frequency of the in-machine robot when the detected vibration is greater than or equal to the threshold,
wherein
the one or more processors are configured to, by executing the program: execute, as the process to change the natural frequency, a process to exchange an end effector of the in-machine robot with another end effector having a different mass.

7. A machine tool comprising:
an in-machine robot;
a vibration sensor that detects a vibration of the in-machine robot during a cutting process; and
one or more processors configured to, by executing a program stored in a memory: execute a process to change a natural frequency of the in-machine robot when the detected vibration is greater than or equal to the threshold, wherein
the one or more processors are configured to, by executing the program: execute, as the process to change the natural frequency, a process to change an orientation of the in-machine robot.

8. The machine tool according to claim 7, wherein
the processor executes, as the process to change the natural frequency, a process to change between a state where the in-machine robot has an extended arm and a state where the in-machine robot has a folded arm.

9. A machine tool comprising:
an in-machine robot;
a vibration sensor that detects a vibration of the in-machine robot during a cutting process; and
one or more processors configured to, by executing a program stored in a memory:
execute a process to change a natural frequency of the in-machine robot when the detected vibration is greater than or equal to the threshold, wherein
the one or more processors are configured to, by executing the program: execute, as the process to change the natural frequency, one of a process to exchange an end effector of the in-machine robot with another end effector having a different mass or a process to change an orientation of the in-machine robot; and further execute the other of these processes when the vibration does not become lower than the threshold.

10. A machine tool comprising:
an in-machine robot;
a vibration sensor that detects a vibration of the in-machine robot during a cutting process; and
one or more processors configured to, by executing a program stored in a memory: execute a process to change a natural frequency of the in-machine robot when the detected vibration is greater than or equal to the threshold, wherein
the one or more processors are configured to, by executing the program: execute, as the process to change the natural frequency, one of a process to exchange an end effector of the in-machine robot with another end effector having a different mass or a process to change an orientation of the in-machine robot when the detected vibration is greater than or equal to a first threshold serving as the threshold; and execute the other of these processes when the detected vibration is greater than or equal to a second threshold serving as the threshold, the second threshold being greater than the first threshold.

* * * * *